United States Patent [19]

Reichman et al.

[11] Patent Number: 5,010,456
[45] Date of Patent: Apr. 23, 1991

[54] HEADLIGHT SUPPORT

[75] Inventors: Karl-Heinz Reichman, Stockstadt; Heinrich W. Krumb, Trebur, both of Fed. Rep. of Germany

[73] Assignee: General Motors Corporation, Detroit, Mich.

[21] Appl. No.: 467,435

[22] Filed: Jan. 19, 1990

[30] Foreign Application Priority Data

Jan. 26, 1989 [DE] Fed. Rep. of Germany ....... 3902229

[51] Int. Cl.$^5$ .............................................. B60Q 1/00
[52] U.S. Cl. .................................... 362/61; 362/80; 362/82; 362/418; 362/427
[58] Field of Search .................. 362/61, 80, 83.3, 418, 362/420, 427, 430, 374, 375, 368, 370, 371, 82, 422

[56] References Cited

U.S. PATENT DOCUMENTS 4,249,232  2/1981  Dick ..................................... 362/61

FOREIGN PATENT DOCUMENTS 2721554  11/1978  Fed. Rep. of Germany ........ 362/80
3616694  11/1987  Fed. Rep. of Germany ........ 362/61
1227076   2/1960  France ................................. 362/80
2413239   8/1979  France ................................. 362/61
2088543  11/1980  United Kingdom .................. 362/61

Primary Examiner—Ira S. Lazarus
Assistant Examiner—Sue Hagarman
Attorney, Agent, or Firm—Edward J. Biskup

[57] ABSTRACT

A headlight housing is mounted to a vehicle body structure and adapted for pivoting movement on the upper side thereof. On the lower side of the headlight housing, a bracket is provided which is fashioned so as to serve as a biasing element. The bracket urges, by the action of compression spring, the headlight housing forwardly so that the headlight lens bears against the edge of a bumper without a gap being created in this region.

3 Claims, 2 Drawing Sheets

HEADLIGHT SUPPORT

This invention relates to a headlight with a headlight housing which has on each of its two opposite sides at least one bracket for connection to the vehicle body. The use of headlights of this type in modern vehicles is relatively common and well known in the art.

Such headlights are usually mounted in a region between the engine hood and the bumper. Since the tolerances of the vehicle body are relatively large in this area, a relatively wide gap must be provided between the lower edge of the headlight housing and the bumper to compensate for installation tolerances. This is usually considered as being unsightly, especially if the width of the gap varies over the length of the headlight housing. Very often such gaps are covered by an elastic material, such as a rubber seal, but this, too, is considered unsightly.

It is the object of the present invention to provide an arrangement wherein there is no wide gap, or no gap at all, between the headlight and the adjoining components, and which does not require the provision of very tight tolerances.

This object is being met in accordance with the invention in that at least one bracket is an elastic biasing element which maintains a preload on the head light to maintain the same in a forward position.

This arrangement will enable to first rigidly connect the headlight housing to the body structure by means of the brackets connected to the headlight housing. Subsequently, an adjoining component, such as a bumper, can be mounted to the vehicle in such a manner that it abuts against the headlight and urges the same, by compressing its elastic biasing element, slightly out of its forward position. Thus, compensation is made for installation tolerances in that the headlight housing is urged, to a greater or lesser extent, rearwardly by the adjoining component, from its forward position. This will obviate the necessity for a gap which had been present in prior-art arrangement to compensate for installation tolerances.

If a component is to flushly engage the headlight only on one side, as for instance a bumper which is to flushly engage with the lower side of the headlight, it is preferable that on one side of the headlight housing at least one bracket be provided which permits pivoting movement of the headlight housing about an axis extending parallel to the respective side, and that the bracket that functions as a biasing element be located on the opposite side. This will provide that the headlight is displaceable only in one region, namely in that region in which compensation is to be made for tolerances.

To provide flush engagement of a bumper with the lower side of a headlight, it is advantageous that, in accordance with another feature of the invention, two brackets, which permit pivoting movement of the headlight housing, be provided on the upper side of the headlight housing, and only one bracket, which functions as a biasing element, be provided on the lower side of the headlight housing.

The brackets which serve as a biasing element may be rendered resilient in that they are provided with respective elastically deformable rubber elements.

To increase the spring travel of the brackets, it is proposed that the brackets serving as biasing elements be provide with respective compression springs, with one end of said springs bearing against a member connected with the headlight housing, and the other end against a member to be connected with the vehicle body structure, said member being adapted for limited displacement relative to the member connected with the headlight housing.

In accordance with an advantageous feature of the invention which renders the bracket serving as a biasing element relatively simple, the member that is rigidly connected with the headlight housing is provided with a plug-like member which has a barb-like catch at its free end, and the member to be connected with the body structure is slipped into this plug-like member over the barb-like catch, with a compression spring being interposed therebetween.

The tolerances between the locations on the body structure where the headlight is to be mounted may be relatively large if the member that is combined with the plug-like member is in the form of a lever which is oriented radially outwardly from the plug-like member, with said lever having an aperture at its free end for accommodating a threaded fastening element. By changing the angular position of the lever relative to the longitudinal axis of the plug-like member, one can easily compensate for deviations in the location of the fastening places.

The brackets that permit pivoting movement of the headlight may be rendered relatively simple if they are in the form of angular members made from an elastic material which are connected at one end to the headlight housing and are provided at the other end with an aperture for accommodating a threaded fastening element.

It should be appreciated that a variety of arrangements may be utilized in the practice of the invention. To convey the concept of the invention, one exemplary embodiment is illustrated in the drawings, wherein.

Figure 1:
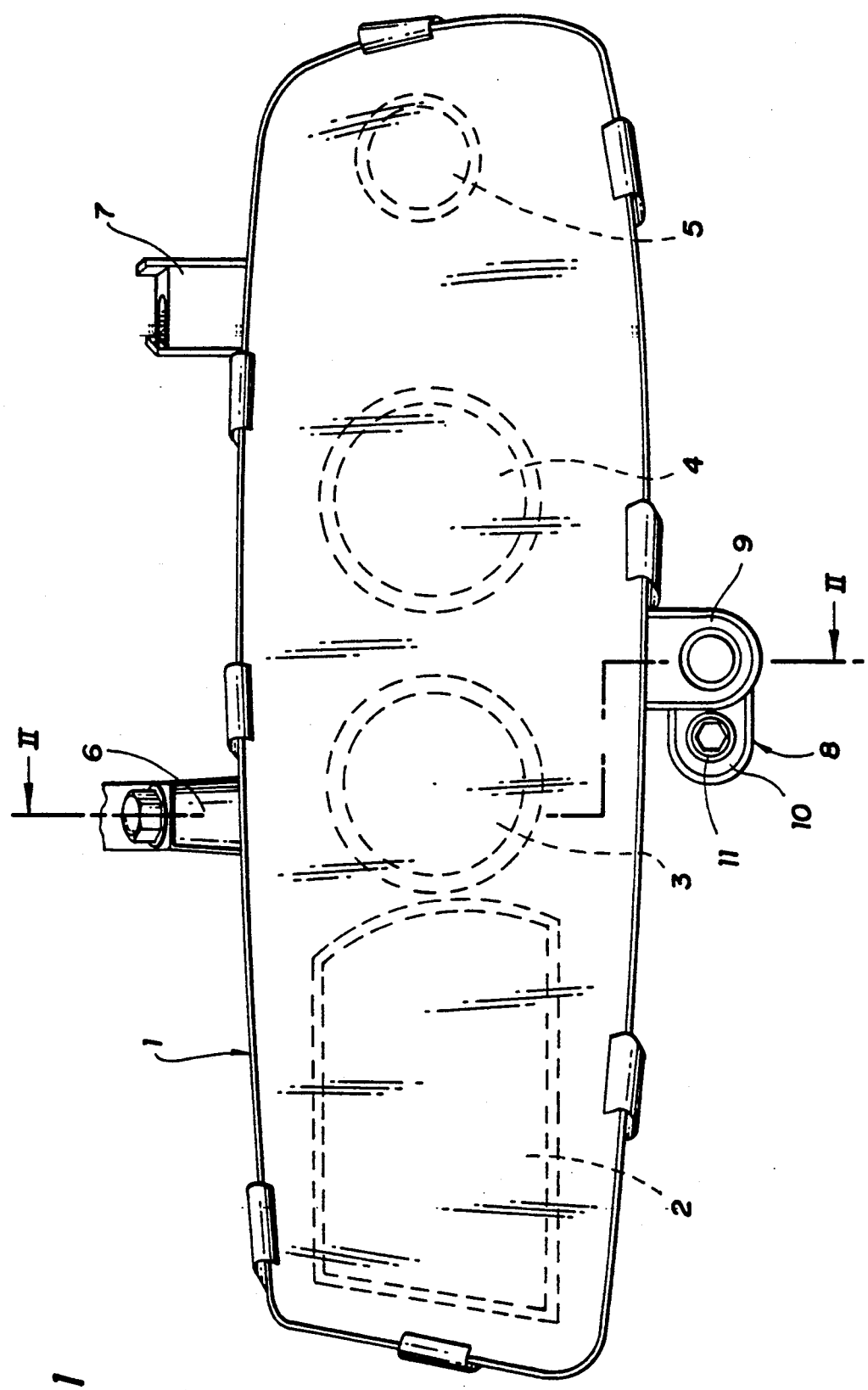
FIG. 1 is a front view of a headlight according to the invention.

The headlamp unit, which is shown in FIG. 1 in its entirety, has arranged in a headlamp housing 1 in side-by-side relationship a high beam light 2, fog light 3, low beam light 4 and a flashing light 5. For securing the headlamp housing 1 to the vehicle body structure, the housing 1 is provided on its upper side with two brackets 6, 7 and on its lower side with a bracket 8. The two upper brackets 6, 7 are angular members and are elastically deformable. The lower bracket 8 is fashioned so as to serve as a biasing element and is comprised of a shackle-like member 9 which is rigidly secured to the headlight housing 1 and a lever 10. The lever 10 is pivotally connected at one end to the shackel-like member 9 and has an aperture 11 at its other end for a fastening screw to connect the headlight housing 1 to the body structure.

Figure 2:
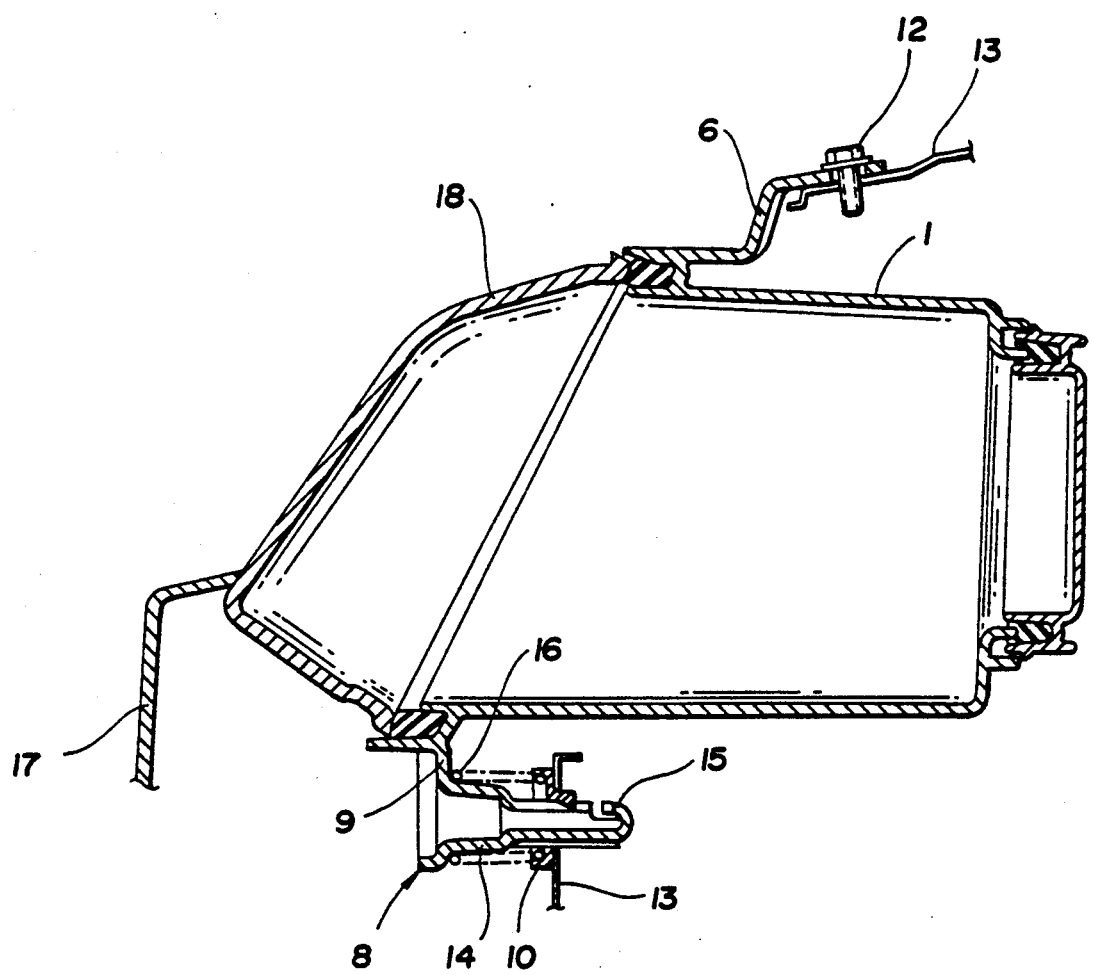
FIG. 2 is a vertical section through the headlight along the II—II in FIG. 1.

As illustrated in FIG. 2, the bracket 6 is in the form of an angle member. A fastening screw 12 is shown which serves to secure the bracket 6 to the body structure 13. It is important for the purpose of the invention that the bracket 6, just as the bracket 7 shown in FIG. 1, be elastically deformable and be adopted to permit pivoting movement of the headlight housing 1 about a horizontal axis.

FIG. 2 also illustrates the configuration of the bracket 8 that serves as a biasing element. It is apparent from this figure that the shackle-like member 9 has formed thereon a plug-like member 14. The plug-like member 14 has at its free end a catch 15, and the unfastened end of the lever 10 is fitted around the plug-like member 14 and includes a depending stop member extends downwardly into a longitudinal slot in the member 14 that cooperates with the catch 15. A compression spring 16 bears at one end against the shackle-like member 9 and at the other end against the aforesaid unfastened end of the lever 10, and the compression spring 10 would cause the stop member of the lever 10 to contact the catch 15 if the headlight housing 1 would not be in the installed condition, as illustrated in the drawing. A portion 13 of the vehicle body structure which is in the region of the bracket 8 and to which the lever 10 is secured is also shown in the drawing.

The bracket 8 which serves as a biasing element enables a biasing force to be exerted, through compression spring 16, at the lower portion of the headlight housing 1. The headlight housing 1 is thereby urged into the vehicle, which will causing pivoting movement of the headlight housing in the region of the upper brackets 6 and 7. This movability of the headlight housing 1 is utilized when a bumper 17 is to be mounted to the vehicle. It is apparent from FIG. 2 that the bumper 17 flushly bears against a headlight lens 18. The fastening locations of the bumper (not illustrated) are arranged such that the bumper 17 always urges the headlight housing slightly into the vehicle. This will assure that the bumper 17 always bears flushly against the headlight lens 18 without the need of having to adhere to tight manufacturing tolerances.

Various changes and modifications can be made in the above-described construction without departing from the spirit of the invention. Such changes and modifications are contemplated by the inventors and they do not wish to be limited except by the scope of the appended claims.

The embodiments of the invention in which an exclusive property or privilege is claimed are defined as follows:

1. A headlamp assembly mounted at the front end of a motor vehicle adjacent a forwardly located panel of the motor vehicle, means connected to an upper portion of said headlamp assembly for allowing said headlamp assembly to pivot about a horizontal axis extending transversely to the longitudinal axis of said motor vehicle, and means connected to a lower portion of said headlamp assembly for biasing the latter forwardly into contact with said panel so as to eliminate any gap between said panel and said headlamp assembly, the improvement wherein said last mentioned means includes a lever member having a first end portion and a second end portion, a plug member formed with said lower portion of said headlamp assembly that extends into the first end portion of said lever member, means fastening the second end portion of said lever member to said motor vehicle for adjustable movement about an axis substantially parallel to the longitudinal axis of said plug member, a spring between said plug member and said lever member for biasing said headlamp assembly into contact with said panel, a catch formed on said plug member, and a stop member formed on said first end portion of said lever member cooperating with said catch for limiting the forward movement of said headlamp relative to the motor vehicle.

2. The headlamp assembly of claim 1 wherein said first end portion of said lever member encircles a portion of said plug member adjacent said catch.

3. The headlamp assembly of claim 1 wherein said plug member is formed with a longitudinally extending slot in which said stop member is normally located.

* * * * *